United States Patent [19]

Saito et al.

[11] Patent Number: 5,073,268

[45] Date of Patent: Dec. 17, 1991

[54] PROCESS AND SYSTEM FOR PURIFYING PURE WATER OR ULTRAPURE WATER

[75] Inventors: Takayuki Saito; Ken Nakajima; Yoki Iwase, all of Kanagawa; Yukio Ikeda, Tokyo; Hiroyuki Shima, Kanagawa, all of Japan

[73] Assignees: Ebara Corporation, Tokyo; Ebara Research Co., Ltd., Fujisawa, both of Japan

[21] Appl. No.: 625,427

[22] Filed: Dec. 11, 1990

[30] Foreign Application Priority Data

Dec. 19, 1989 [JP] Japan .................................. 1-327135

[51] Int. Cl.$^5$ ............................................. B01D 15/04
[52] U.S. Cl. ..................................... 210/638; 210/649;
210/651; 210/748; 210/760; 210/900; 55/16; 55/158
[58] Field of Search ............... 210/649, 638, 639, 900, 210/651, 321.62, 242.1, 490, 641, 750, 757, 758, 748, 760, 764; 55/16, 3, 55, 68, 158; 243/580

[56] References Cited

U.S. PATENT DOCUMENTS

| | | | |
|---|---|---|---|
| 4,311,594 | 6/1982 | Perry | 210/640 |
| 4,698,153 | 10/1987 | Matsuzaki et al. | 210/900 |
| 4,787,980 | 11/1988 | Ackermann et al. | 210/638 |
| 4,836,929 | 6/1989 | Baumann et al. | 210/748 |
| 4,950,314 | 8/1990 | Yamada et al. | 55/16 |
| 4,990,260 | 2/1991 | Pisani | 210/900 |

FOREIGN PATENT DOCUMENTS

3264199 11/1988 Japan .................................. 210/900

Primary Examiner—W. Gary Jones
Assistant Examiner—Ana Fortuna
Attorney, Agent, or Firm—Oblon, Spivak, McClelland, Maier & Neustadt

[57] ABSTRACT

Ultrapure water of extremely high purity, i.e. a so-called ultra-ultrapure water is formed by the present system for purifying a pure water or ultrapure water, (1) the TOC component which was contained in pipes, etc. and which was subsequently dissolved in a pure water or ultrapure water to be treated, is decomposed and the pure water or ultrapure water is simultaneously sterilized, by the combined use of an oxidizing agent and ultraviolet irradiation, (2) the DO contained in the water to be treated and the DO derived from the addition of the oxidizing agent are decomposed into $H_2O$ and simultaneous sterilization is effected, by the combined use of $H_2$ gas and ultraviolet irradiation, (3) the remaining $H_2$ gas is removed by a membrane degassing unit, and (4) the resulting water is subjected to an ion exchange treatment and an ultrafiltration treatment, in the above order, whereby the pure water or ultrapure water whose purity has been reduced by, for example, the dissolution of the impurities contained in pipes can be purified and converted to an ultrapure water of extremely high purity. The resulting ultrarapure water is particularly utilized as a rinsing water in the electronics industry where ultrahigh density integrated circuits (ULSI circuits) represented by 4 megabit dynamic memory are produced.

3 Claims, 8 Drawing Sheets

PROCESS AND SYSTEM FOR PURIFYING PURE WATER OR ULTRAPURE WATER

BACKGROUND OF THE INVENTION

1. Field of the Invention

The present invention relates to the production of ultrapure water for use in the electronics industry, drug industry, etc. and particularly to a process and system for purifying pure water or ultrapure water by retreating pure water or ultrapure water to produce ultrapure water of extremely high purity.

2. Prior Art

In the electronics industry where ultrahigh density integrated circuits (ULSI circuits), represented by a 4 megabit dynamic memory, are produced, pure water of ultrahigh purity, i.e., ultrapure water, is required in large quantities for rinsing semiconductor products after each production step. For example, quality requirements for ultrapure water become increasingly severe as the integration of LSI circuit becomes higher, as shown in Table 1; and a reduction particularly in TOC (total organic carbon), living microbes and DO (dissolved oxygen) is a big task.

TABLE 1

| Item | Integration | | |
|---|---|---|---|
| | 1M | 4M | 16M |
| Resistivity (MΩ-cm at 25° C.) | >17.5 | >18.0 | >18.0 |
| Fine particles (counts/ml) | | | |
| 0.1 μm | <20 | | |
| 0.08 μm | | <10 | |
| 0.05 μm | | | <10 |
| Living microbes (counts/100 ml) | <10 | <5 | <1 |
| TOC (μg C/l) | <50 | <30 | <10 |
| Silica (μm $SiO_2$/l) | <10 | <3 | <1 |
| DO (μg O/l) | <100 | <50 | <50 |

In conventional production of ultrapure water, a starting water is treated by a pretreatment apparatus which is a combination of a coagulation and precipitation unit, a sand filtration tower or an active carbon tower, etc. The resulting pretreated water is treated by a primary pure water production apparatus which is a combination of an ion exchange resin tower, a decarbonation tower, a reverse osmosis membrane unit, a vacuum degassing tower, a mixed bed type cartridge demineralizer, etc. The resulting primary pure water is treated in a secondary pure water production apparatus (a subsystem) which is a combination of an ultraviolet sterilization unit, a mixed bed type cartridge demineralizer and an ultrafiltration membrane unit, to obtain ultrapure water. This ultrapure water is fed to various semiconductor production apparatuses.

FIG. 8 shows the conventional arrangement of a pretreatment apparatus, a primary pure water production apparatus, a subsystem and semiconductor production apparatuses.

That is, in FIG. 8, a starting water 1 is passed through a pretreatment apparatus 2 and a primary pure water production apparatus 3 to obtain a primary pure water. The pretreatment apparatus 2 and the primary pure water production apparatus 3 are ordinally installed in a building apart from a factory building in which semiconductor production apparatuses are installed. The primary pure water is introduced into a high purity water tank 4 installed in the factory building, via a primary pure water pipe 7.

The primary pure water stored in the high purity water tank 4 is treated by a subsystem 5 to be converted to an ultrapure water. This ultrapure water is introduced into the semiconductor production apparatuses 6 via an ultrapure water pipe 8. Any excess of ultrapure water is separated off just before the semiconductor production apparatuses 6 and is returned to the high purity tank 4 via a return pipe 9. Thus, the high purity water tank 4, the subsystem 5, the ultrapure water pipe 8 and the return pipe 9 form a loop, whereby ultrapure water is circulated constantly.

The ultrapure water used for a rinsing purpose at the semiconductor production apparatuses 6 becomes a waste water 11 discharged via a waste water pipe 10. The portion of the waste water 11 having a relatively good quality is recovered by a waste water recovery unit, etc. (not shown in FIG. 8) and, in some cases, is utilized as a starting water 1.

It is known that in the arrangement illustrated by FIG. 8, the ultrapure water obtained from the subsystem 5 is significantly reduced in its purity when it stops flowing and is stagnant. The reason is that the TOC, inorganic salts, etc. contained in the pipe, etc. dissolve in the ultrapure water at the portion of the pipe, etc. contacting the ultrapure water. Therefore, the ultrapure water has heretofore been circulated constantly in the loop formed by the subsystem 5, the ultrapure water pipe 8, the return pipe 9 and the high purity water tank 4, to prevent the deterioration of the purity of the ultrapure water.

However, the subsystem 5 and the semiconductor production apparatuses 6 are installed relatively apart from each other in many cases, and the length of the ultrapure water pipe 8 reaches 100–500 m in some cases. When ultrapure water is passed through such a long pipe, the purity of the ultrapure water tends to deteriorate even though the water is circulated constantly without being allowed to stagnate. In view of the trend toward higher density integration of LSI circuits and the fact that the quality requirements for ultrapure water are correspondingly becoming increasingly higher, as shown in Table 1, it is important to introduce ultrapure water obtained from the subsystem 5, into the semiconductor production apparatuses 6 without any substantial reduction in quality.

As described above, with the conventional ultrapure water production system, it was very difficult to introduce the ultrapure water obtained therefrom, into the semiconductor production apparatuses without a reduction in the quality of the ultrapure water. Further, with the adoption of more complex semiconductor production steps and more diversified semiconductor production apparatuses, the length of the ultrapure water pipe 8 has become larger necessarily, which has resulted in a reduction in ultrapure water quality.

SUMMARY OF THE INVENTION

It is therefore an object of the present invention to provide a process for purifying pure water or ultrapure water by treating pure water or ultrapure water to effectively produce ultrapure water of higher purity.

It is an another object of the present invention to provide a system for purifying pure water or ultrapure water by treating pure water or ultrapure water to effectively produce ultrapure water of higher purity.

Other objects and advantages of the present invention will become apparent to those skilled in the art from the following description and drawings.

DETAILED DESCRIPTION OF THE PREFERRED EMBODIMENTS:

In order to achieve the above object, the present invention provides a process for purifying pure water or ultrapure water by treating pure water or ultrapure water to produce ultrapure water of higher purity, which process comprising:

(a) a step of dissolving about $10^{-2}$–$10^2$ mol of ozone or hydrogen peroxide per 1 g of TOC in pure water or ultrapure water and irradiating the resulting water with a total dose of ultraviolet radiation of more than about 0.1 mW sec/cm$^2$, whereby the TOC component is decomposed and simultaneously the pure water or ultrapure water is sterilized;

(b) a step of dissolving hydrogen gas in a molar ratio of $H_2$ gas to an oxidizing agent of about 1-10 in the treated water obtained in the step (a) and irradiating the resulting water with a total dose of ultraviolet radiation of more than about 10 mW sec/cm$^2$, whereby the DO contained in the water to be treated and the DO derived from the addition of the oxidizing agent are decomposed into $H_2O$ and simultaneously sterilization is effected;

(c) a step of passing the treated water obtained in the step (b), through one side of a gas permeable membrane while keeping the other side of the membrane in a vacuum, to effect membrane degassing for said water, whereby the remaining $H_2$ gas is substantially removed;

(d) a step of passing the treated water obtained in the step (c) at about 10-200 m/hr of linear velocity, through an ion exchange resin layer which is a mixture of a $H^+$ type strongly acidic cation exchange resin and a $OH^-$ type strongly basic anion exchange resin, whereby the ions and silica are removed; and (e) a step of subjecting the treated water obtained in the step (d), to ultrafiltration with employing a membrane capable of removing solutes having molecular weight of about 3,000-30,000, whereby the fine particles are removed.

The present invention also provides, as a system for using in the above purification process, a system for purifying pure water or ultrapure water, which system comprises:

(a) an ozone- or hydrogen peroxide-dissolving unit and an ultraviolet irradiation unit;

(b) a hydrogen gas-dissolving unit and an ultraviolet irradiation unit;

(c) a membrane degassing unit having a gas permeable membrane;

(d) an ion exchange unit having an ion exchange resin layer which is a mixture of a $H^+$ type strongly acidic cation exchange resin and a $OH^-$ type strongly basic anion exchange resin;

(e) an ultrafiltration unit; and (f) pipes connecting the units (a) to (e) in this order and pumps.

In the above purification system, there is used, as the gas permeable membrane, a porous hydrophobic membrane which gases such as oxygen, nitrogen, hydrogen, steam and the like permeate but water does not permeate and which is selected from a silicone rubber type, a poly(ethylene tetrafluoride) type, a polyolefin type and a polyurethane type.

The present invention is described in detail below.

Figure 1:
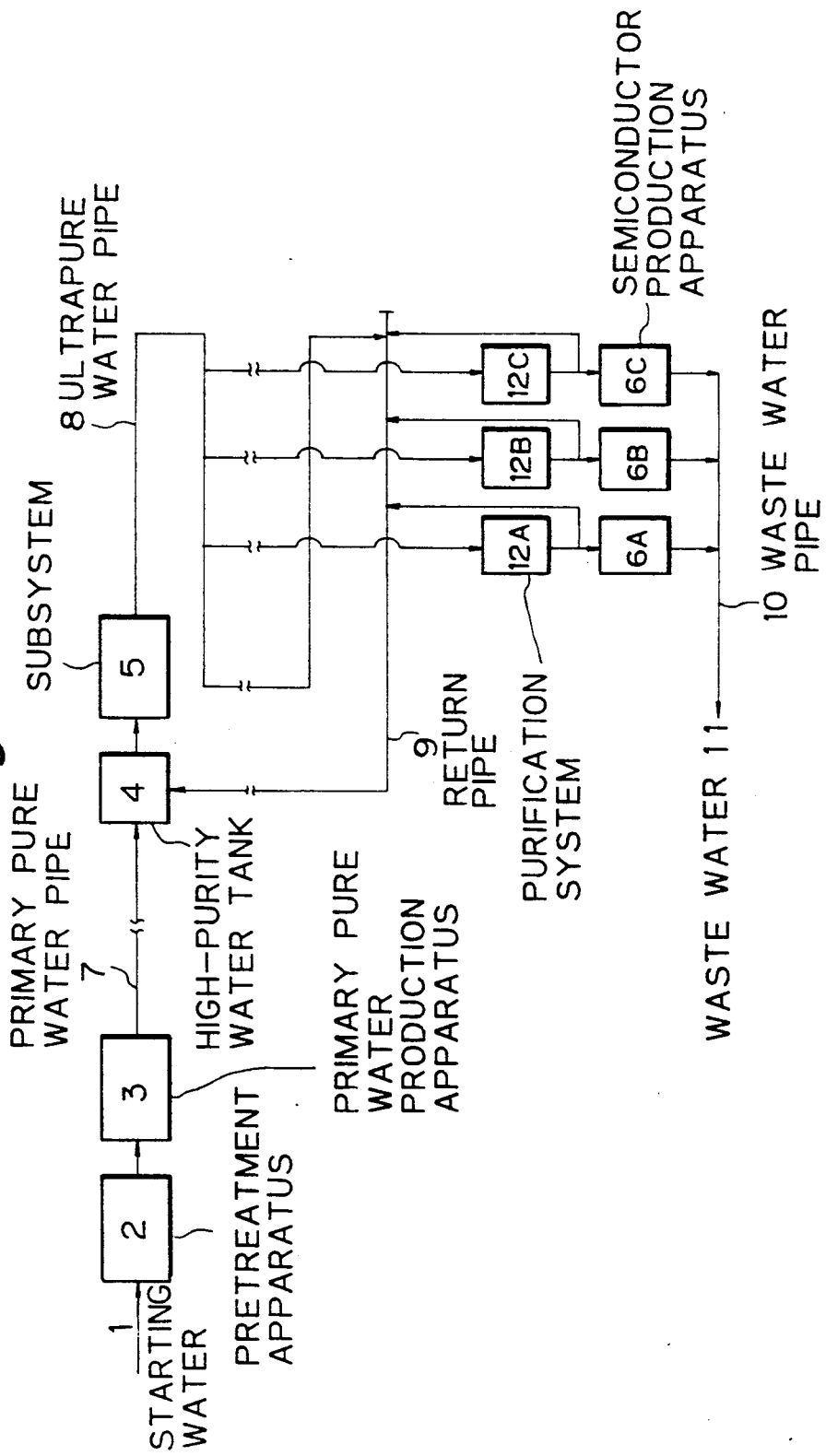
FIG. 1 is a flow chart showing one embodiment of the present invention.
Figure 2:
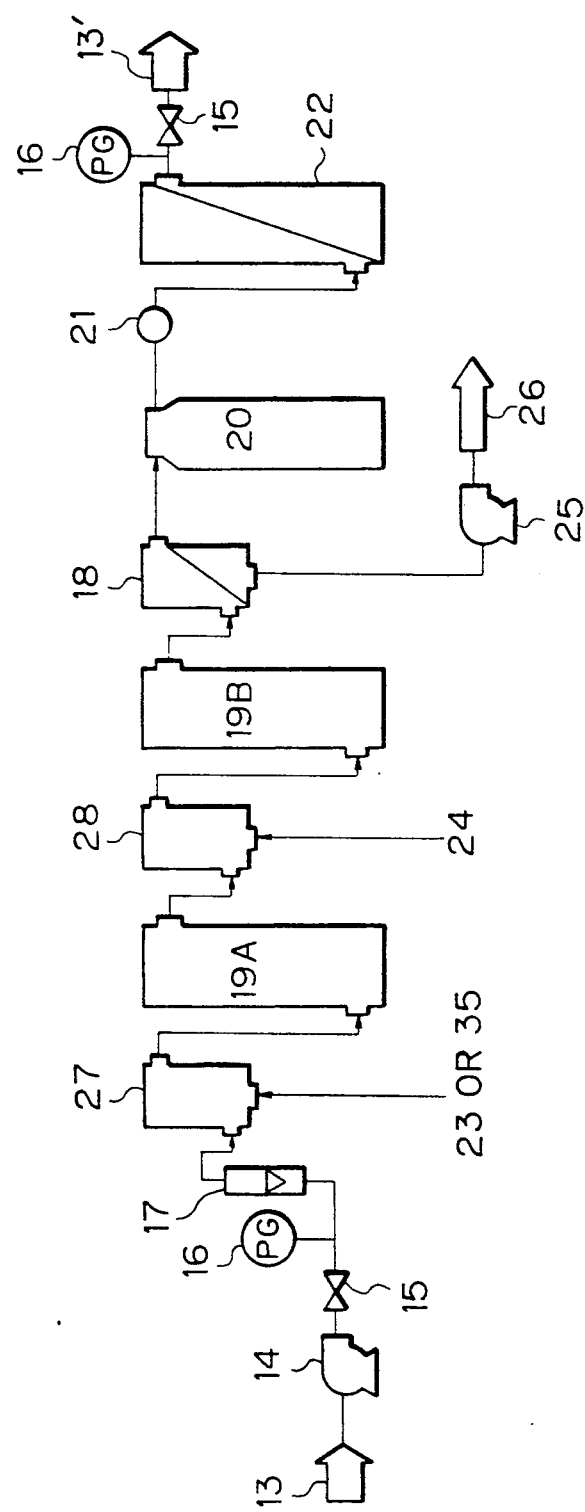
FIG. 2 is a flow chart explaining in more detail the purification system of the present invention shown in FIG. 1.

FIG. 1 is a flow chart showing one embodiment of the present invention; and FIG. 2 is a flow chart explaining in more detail the purification system of the present invention shown in FIG. 1.

Firstly, the arrangement of the units used in the present system is explained referring to FIG. 1. A starting water 1 is treated in a pretreatment apparatus 2 and a primary pure water production apparatus 3 to obtain a primary pure water. The primary pure water is introduced into a high purity water tank 4 via a primary pure water pipe 7. The primary pure water from the high pure water tank 4 is treated by a subsystem 5 to obtain an ultrapure water. The constitution up to this stage is the same as that of a conventional ultrapure water production system.

As described above, the subsystem 5 and the semiconductor production apparatuses 6 are installed relatively apart from each other. This arrangement necessitates the use of a very long pipe for feeding the ultrapure water from the subsystem 5 to the semiconductor production apparatuses 6, and the purity of the ultrapure water is reduced when flowing therethrough owing to, for example, the dissolution of impurities contained in the pipe.

This problem can be solved either by using a pipe made of a material resulting in no impurities being dissolved, or by retreating the ultrapure water suffering a reduction in purity to obtain an ultrapure water of improved purity.

As a material resulting in a relatively low dissolution of impurities when used as a flow pipe, there can be mentioned, for example, a polyether ether ketone (PEEK); however, such a material is very expensive, its workability for fixing is low, and existing pipe lines are very complex and replacement works are very difficult; therefore, the change to a new material is fairly difficult.

As a matter of course, it is important from a cost standpoint to improve water quality by utilizing an existing system for production of ultrapure water, to an utmost extent.

In the present invention, a purification system 12 is installed upstream of and in the vicinity of the semiconductor production apparatuses 6 to remove the impurities derived from pipes, etc., to obtain an ultrapure water of improved purity.

The purification system of the present invention is described in more detail with reference to FIG. 2.

In FIG. 2, an ultrapure water 13 of reduced purity is introduced into an ozone- or hydrogen peroxide-dissolving unit 27 via a pump 14, a valve 15, a pressure gauge 16 and a flow meter 17. The water in which ozone 23 or hydrogen peroxide 35 has been dissolved is introduced into an ultraviolet irradiation unit 19A. The ultraviolet-irradiated water is introduced into a hydrogen gas-dissolving unit 28 to dissolve hydrogen gas 24 therein. The hydrogen gas-dissolved water is introduced into an ultraviolet irradiation unit 19B.

The treated water from the ultraviolet irradiation unit 19B is introduced into one side of a membrane degassing unit 18 whose other side is maintained in a vacuum by a vacuum pump 25 to discharge the removed gas as waste gas 26. The degassed water is passed through a mixed bed type ion exchange cartridge 20 which is a mixture of a H+ type strongly acidic cation exchange resin and a OH− type strongly basic anion exchange resin. The water treated in the ion exchange cartridge 20 is treated in an ultrafiltration unit 22 and passed through a pressure gauge 16 and a valve 15 to obtain an ultrapure water 13'. This is a constitution of the purification system of the present invention.

Figure 3:
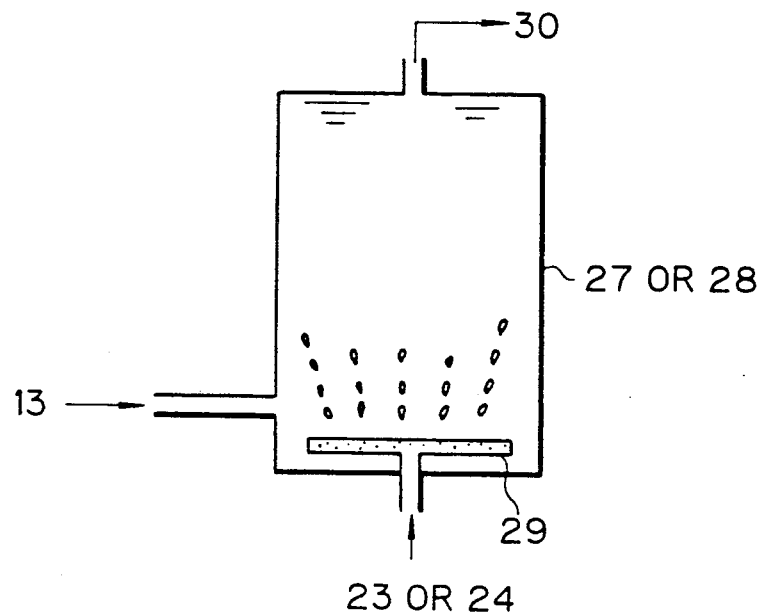
FIGS. 3 and 4 are each a schematic sectional view of an ozone- or $H_2$ gas-dissolving unit used in the present invention.
Figure 4:
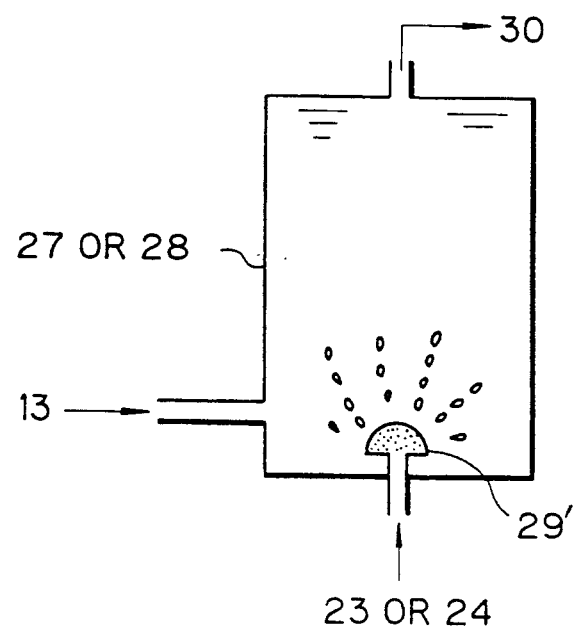
Figure 5:
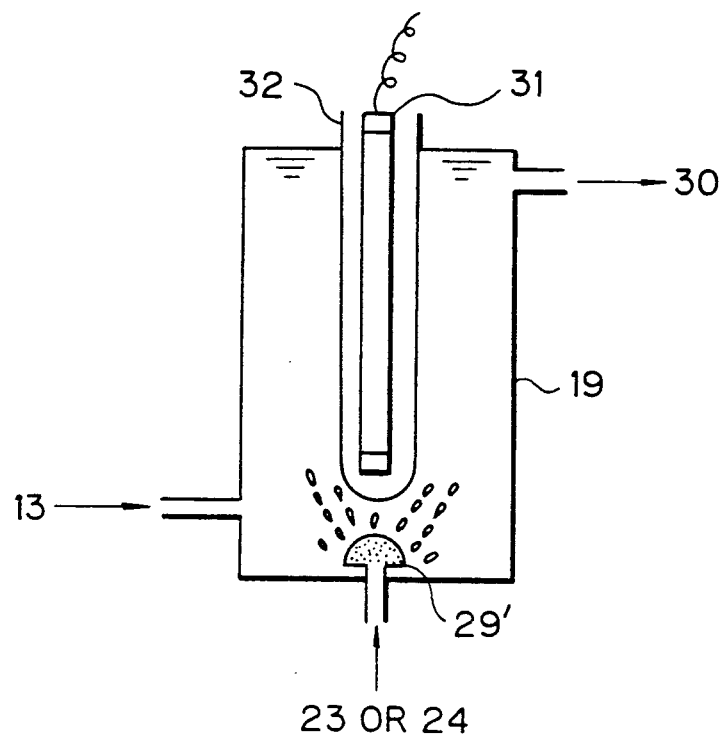
FIGS. 5 and 6 are each a schematic sectional view of other example of the ozone- or $H_2$ gas-dissolving unit.

The dissolution of ozone 23 or $H_2$ gas 24 in the ultrapure water 13 is effected by, for example, an ozone 23-or $H_2$ gas 24-dissolving unit 27 or 28 accommodating a gas-diffusing pipe 29 or a gas-diffusing nozzle 29', as shown in FIGS. 3 or 4. Or, it may be effected by, as shown in FIG. 5, allowing the ultraviolet irradiation unit 19 to accommodate a gas-diffusing nozzle 29' or the like at the bottom and a protective quartz tube 32 and an ultraviolet lamp 31 above the nozzle 29'. Or, as shown in FIG. 6, ozone 23 or $H_2$ gas 24 may be dissolved via a gas permeable membrane 33; in this case, the impurities (e.g. fine particles, etc.) present in the ozone or $H_2$ gas can be removed; therefore, this approach is effective when applied to ultrapure water.

The gas permeable membrane is a membrane which transmits gases such as oxygen, nitrogen, hydrogen, steam and the like but does not transmit water. Water is passed at one side of the membrane, and the other side of the membrane is pressurized by a gas. As a membrane material, there can be mentioned a porous hydrophobic membrane made of a silicone rubber, a poly(ethylene tetrafluoride), a polyolefin, a polyurethane or the like. The membrane has pores of 20 μm or less in diameter, and generally there is widely used a membrane having pore diameters of 0.01-1 μm.

The material of the gas permeable membrane can be selected depending upon the type of the gas used. When a gas containing ozone 23 is used, a membrane made of a poly(ethylene tetrafluoride) is preferable. When hydrogen 24 is used, a membrane made of any of the above-mentioned materials can be used.

Figure 6:
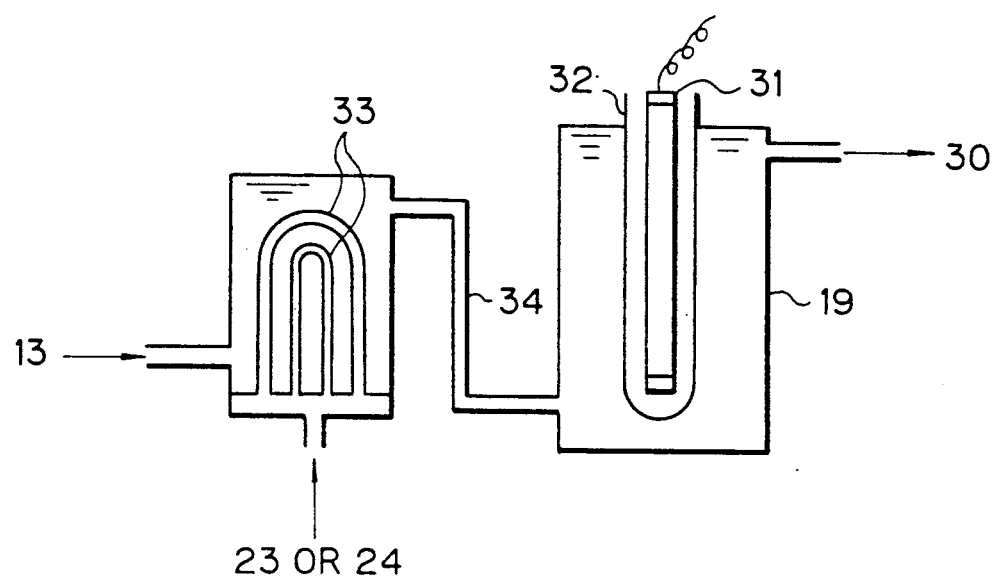

When a hydrogen peroxide-containing water 35 is used in place of ozone 23, the gas permeable membrane 33 in FIG. 6 is not used and instead there is used a membrane filter made of a poly(ethylene tetrafluoride) which has been treated to become hydrophilic. Owing to the treatment to become hydrophilic, the resulting membrane filter has no gas permeability and transmits only liquids, and therefore the filter is an ordinary filter membrane for liquids.

Next, description is made on the ultraviolet irradiation unit 19. The light source used can be any which generates ultraviolet rays having a wavelength of 400 nm or less. A mercury lamp is generally used. Use of, in particular, far-ultraviolet rays having a wavelength of 200 nm or less gives a very striking effect. Besides the mercury lamp, there can also be used, as a light source, an excimer laser, an electron synchrotron, etc.

In the membrane degassing unit 18, water is passed to one side of the gas permeable membrane, and the other side of the membrane is maintained in a vacuum by a vacuum pump 25 to discharge the removed gas as a waste gas 26. The same gas permeable membrane as mentioned above may be used.

The mixed bed type ion exchange cartridge 20 is a mixture of a H+ type strongly acidic cation exchange resin regenerated by a mineral acid such as hydrochloric acid, sulfuric acid or the like and a OH− type strongly basic anion exchange resin regenerated by sodium hydroxide or the like. Each ion exchange resin is, after regeneration and before mixing, washed with water thoroughly. This water washing is necessary to reduce the impurities, particularly TOC component remaining in each resin. The water washing is more effective when effected using pure water heated to about 40° C.

Next, the resistivity meter 21 is used for measuring the purity of the ultrapure water obtained in the purification system of the present invention and is particularly necessary for determining the timing of exchange of the mixed bed type ion exchange cartridge.

The ultrafiltration unit 22 uses a hollow ultrafilter membrane. The hollow membrane includes an internal pressure type wherein a water to be treated is pressurized inside the hollow membrane and treated water is collected outside the membrane, and an external pressure type wherein water to be treated is pressurized outside the hollow membrane and treated water is collected inside the membrane. When water is treated causing substantially no membrane contamination, for example, ultrapure water, there is preferred an external pressure type enabling the suppression of the generation of fine particles from the membrane itself. An ultrafilter membrane of spiral type also exists, but its use in the present system is not preferable in view of dust problems resulting from the use thereof.

A pressure gauge 16 and a valve 15 are installed downstream of the ultrafilter membrane. The pressure at the inlet of the semiconductor production apparatuses is ordinarily maintained at 2 kg/cm² and adjusted to an optimum pressure by 15 and 16.

The thus purified ultrapure water 13' is introduced into semiconductor production apparatuses. As described with respect to FIG. 1, the distance between the system of the present invention and the semiconductor production apparatuses is preferably as small as possible.

Figure 7:
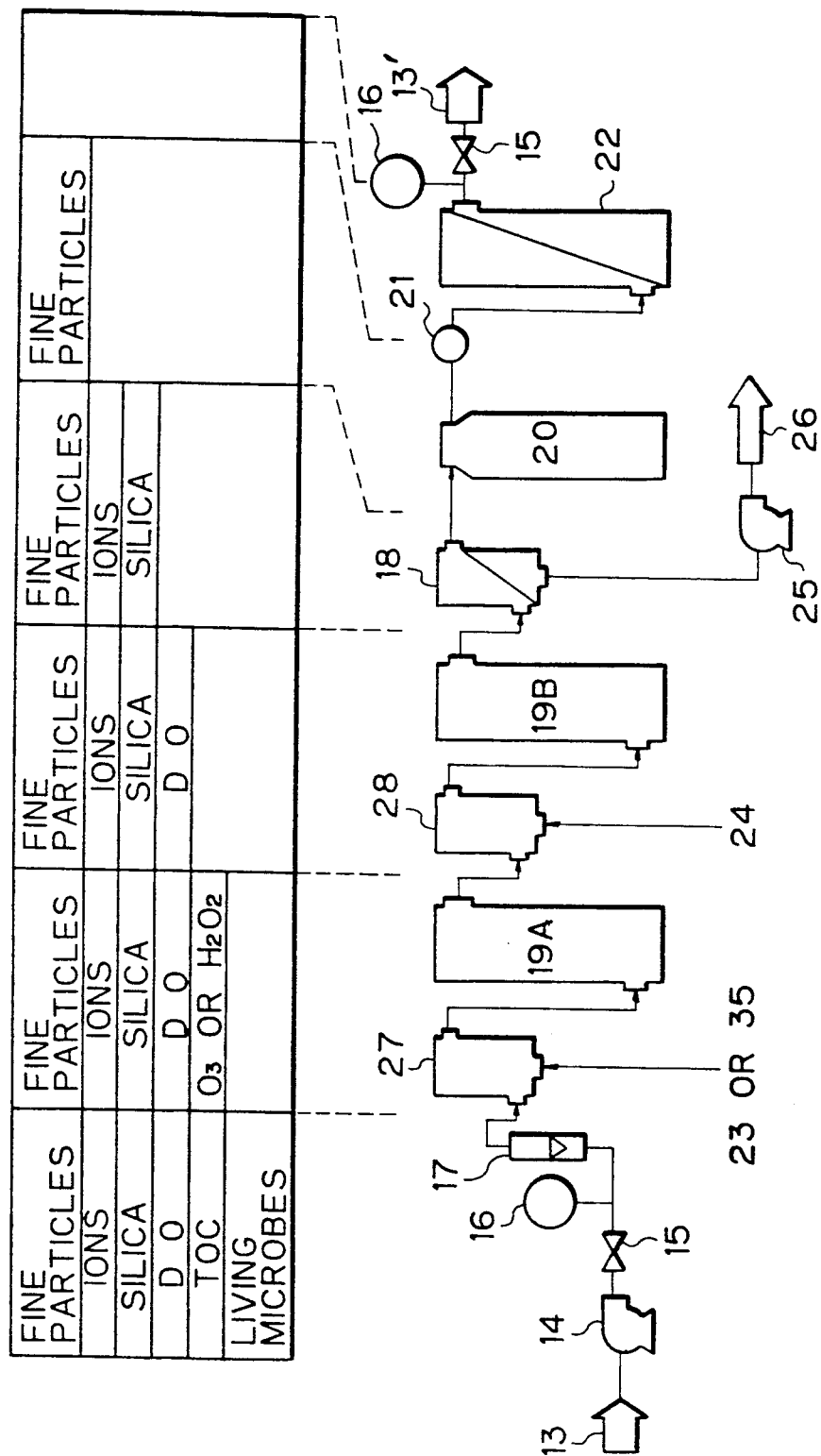
FIG. 7 is a flow chart explaining the action made and the items removed in each step of the present invention.
Figure 8:
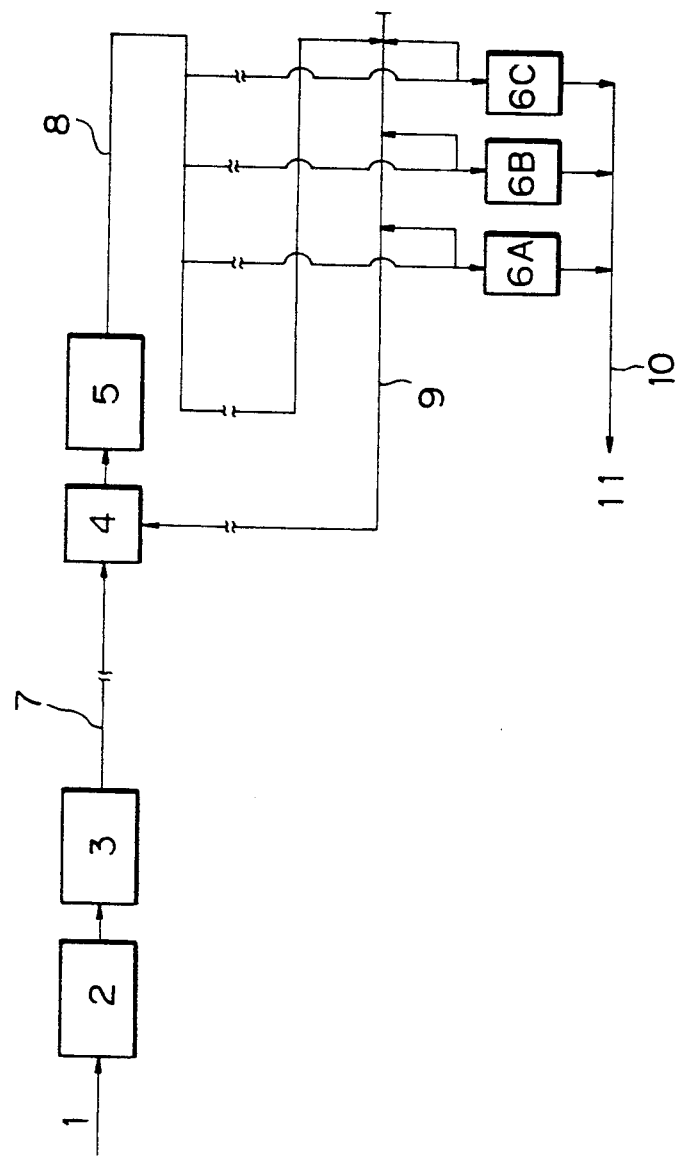
FIG. 8 is a flow chart of a conventional system for production of ultrapure water.

The action of the present invention is described with each treatment step of the present system shown in FIG. 7. An ultrapure water 13 (a water to be treated) contains fine particles, ions, silica, DO, TOC, living microbes, etc. all to be removed. When the ultrapure water 13 is mixed with ozone 23 or hydrogen peroxide 23' and then treated with an ultraviolet irradiation unit 19A, the TOC component in the water 13 is decomposed into organic acids and $CO_2$. Further, living microbes are subjected to strong sterilization by the synergistic action of the oxidizing agent and the ultraviolet rays, to thereby become fine particles (dead microbes).

Therefore, in this treatment, the TOC becomes ions and the living microbes become fine particles, but the ozone and hydrogen peroxide added excessively remain as they are.

Next, the resulting water is mixed with $H_2$ gas 24 and treated with an ultraviolet irradiation unit 19B. The residual oxidizing agent and DO form water by the following reactions. Therefore, in this treatment step, there is no increase in impurities.

$$O_3 + 3H_2 \xrightarrow{UV} 3H_2O$$

$$H_2O_2 + H_2 \xrightarrow{UV} 2H_2O$$

$$O_2 + 2H_2 \xrightarrow{UV} 2H_2O$$

In this treatment step, however, a slight amount of $H_2$ gas remains; accordingly, the fine particles, ions, silica and $H_2$ remain untreated.

The resulting water is then subjected to degassing by a membrane degassing unit 18, whereby $H_2$ gas is removed. Thereafter, treatment with an ion exchange cartridge 20 is effected, whereby the ions and silica are removed and only the fine particles remain in the resulting water. Next, the water is passed through an ultrafiltration unit 22 to remove the fine particles to obtain an ultrapure water of extremely high purity.

In the present invention, particularly the DO, TOC and living microbes which were difficult to treat in the conventional technique, can be removed reasonably and easily.

EXAMPLES

The present invention is described below by way of Example and Comparative Example. However, the present invention is in no way restricted to the following Example.

EXAMPLE 1

Tap water as a starting water was treated in a primary pure water production apparatus constituted by a reverse osmosis filter unit, a vacuum degassing unit, an ion exchange unit, a membrane filter, etc., to obtain a primary pure water. The primary pure water was treated in a secondary pure water production apparatus (a subsystem) constituted by an ultraviolet sterilization unit, an ion exchange cartridge and an ultrafiltration unit, to obtain a so-called ultrapure water. The ultrapure water was passed through a purification system shown in FIG. 9 at a rate of 400 l/hr.

Figure 9:
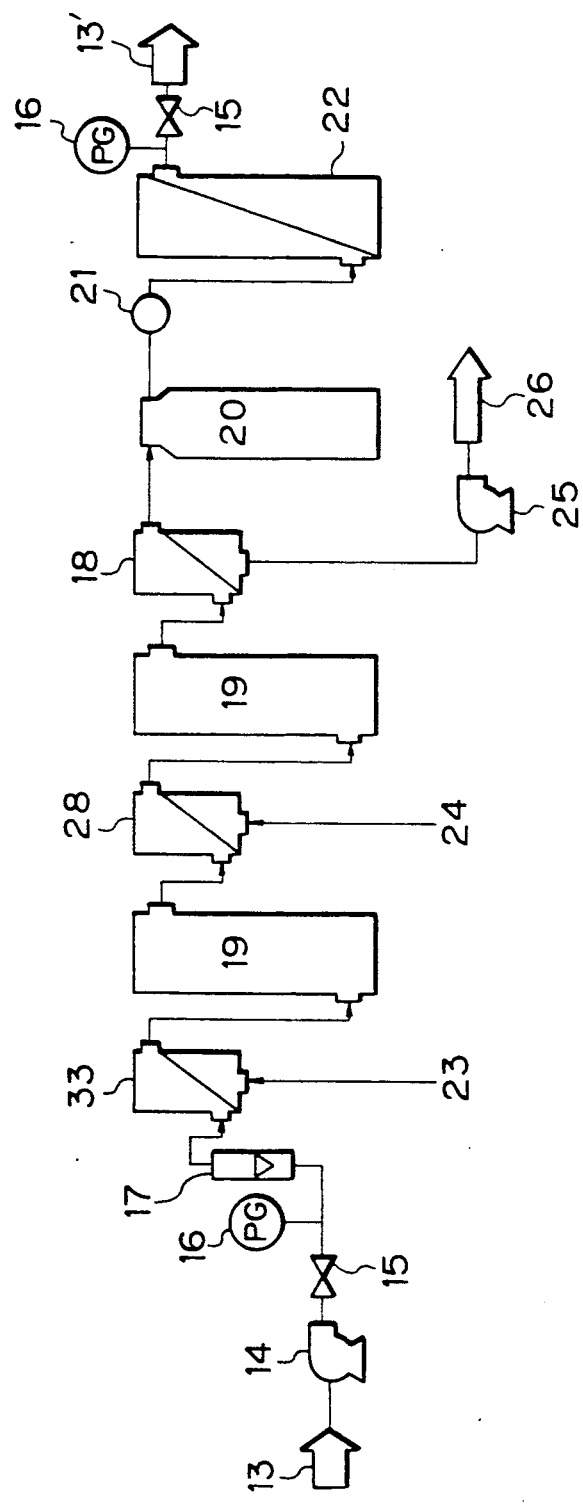
FIG. 9 is a flow chart of the purification system used in the above Example.

In FIG. 9, the gas permeable membrane 33 is a hollow type made of a poly(ethylene tetrafluoride), and there was used a module having a membrane area of 0.85 m² and 6,500 membranes. A water to be treated (the above-mentioned ultrapure water) was passed to one side of the gas permeable membrane 33, and into the other side was introduced an ozonated air containing 500 ppm of ozone, at 0.2 kg/cm² and 50 N-ml/min.

The ultraviolet irradiation unit 19 had an effective volume of about 1 l. The low-pressure mercury lamp (power consumption: 100 W) installed in the center of the unit 19 via a protective artificial quartz tube, was lighted. The hydrogen gas-dissolving unit 28 was a hollow composite membrane of polyolefin-polyurethane type, and there was used a module having a membrane area of 1.20 m² and 9,000 membranes. A water to be treated was passed to one side of the gas permeable membrane, and into the other side was introduced hydrogen gas at 0.2 kg/cm² and 30N-ml/min.

The membrane degassing unit 18 was the abovementioned hollow composite membrane of polyolefinpolyurethane type, and there was used the same module as above. A water to be treated was passed at one side of the gas permeable membrane, and the other side was kept at a vacuum pressure of about 60 Torr by a vacuum pump 25.

As the ion exchange cartridge 20, there was used a glass fiber-reinforced plastic (FRP) container packed with a mixture of 10 l of a thoroughly washed H type strongly acidic cation exchange resin (Dowex monosphere 650C) and 20 l of a OH type strongly basic anion exchange resin (Dowex monosphere 550A).

As the ultrafiltration unit 22, there was used an internal pressure type hollow membrane module made of a polysulfone (NTU-3050-C3R manufactured by Nitto Denko). The outlet pressure of the ultrafiltration unit was adjusted to 2.5 kg/cm by a pressure gauge 16 and a valve 15.

The treated water 13' obtained by the above purification system of the present invention was analyzed. The results are shown in Table 2. As a clear from Table 2, there was obtained a water of extremely high purity.

COMPARATIVE EXAMPLE 1

Figure 10:
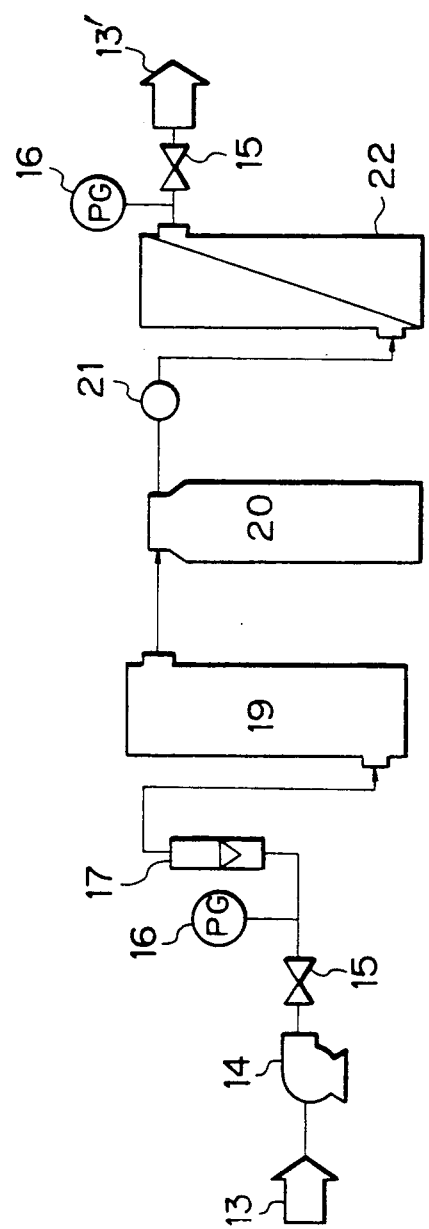
FIG. 10 is a flow chart of the system used in the above Comparative Example.

The ultrapure water obtained similarly from the same primary pure water production apparatus and the same secondary pure water production apparatus, was passed through a conventional subsystem shown in FIG. 10, at a rate of 400 l/hr.

In FIG. 10, the ultraviolet irradiation unit 19, the ion exchange cartridge 20 and the ultrafiltration unit 22 had the same constitutions and dimensions as those used in Example 1.

The treated water obtained by the subsystem was analyzed. The results are shown in Table 2. When the results are compared with those of Example 1, it is clear that DO and living microbes are not removed and the object of improvement of water quality is not achieved.

TABLE 2

|  | Water to be treated | Treated water in Example 1 | Treated water in Comparative Example 1 |
|---|---|---|---|
| Resistivity (MΩ-cm at 25° C.) | 18.0 | 18.1 | 18.1 |
| Fine particles (0.07 μm or more) (counts/ml) | 4 | 0 | 2 |
| Living microbes (counts/l) | 9 | 0.5 | 4 |
| TOC (μg/l) | 18 | 2 | 16 |
| Silica (μg/l) | 3 | 3 | 3 |
| DO (μg/l) | 120 | 5 | 120 |

As described in detail above, in the present system for purifying a pure water or ultrapure water, (1) the TOC component which had been contained in pipes, etc. and has been dissolved in a pure water or ultrapure water to be treated, is decomposed and simultaneously the pure water or ultrapure water is sterilized, by the combined use of an oxidizing agent and ultraviolet irradiation, (2) the DO contained in the water to be treated and to DO derived from the addition of the oxidizing agent are decomposed into $H_2O$ and simultaneous sterilization is effected, by the combined use of $H_2$ gas and ultraviolet irradiation, (3) the remaining $H_2$ gas is removed by a membrane degassing unit, and (4) the resulting water is subjected to an ion exchange treatment and an ultrafiltration treatment to remove fine particles, in the above order, whereby the pure water or ultrapure water whose purity has been reduced by, for example, the dissolution of the impurities contained in pipes can be purified and converted to an ultrapure water of extremely high purity, i.e., a so-called ultra-ultrapure water.

Further, the system of the present invention is installed in the vicinity of semiconductor production apparatuses, etc.; this can minimize the reduction in water quality caused by, for example, the dissolution of impurities contained in pipes.

The present invention can be applied to the purification of process water and cleaning water used in, for example, the electronics industry, drug industry, etc. requiring high purity water.

What is claimed is:

1. A process for purifying pure water or ultrapure water by treating pure water or ultrapure water to produce ultrapure water of high purity, which process comprises the steps of:
   (a) dissolving an oxidizing agent comprising one of ozone or hydrogen peroxide in pure water or ultrapure water and irradiating the resulting water with ultraviolet rays, whereby a total organic carbon component is decomposed and simultaneously the pure water or ultrapure water is sterilized;
   (b) dissolving hydrogen gas in the treated water obtained in step (a) and irradiating the resulting water with ultraviolet rays, whereby dissolved oxygen contained in the water to be treated and dissolved oxygen derived from the addition of the oxidizing agent are decomposed into $H_2O$ and simultaneously sterilization is effected;
   (c) passing treated water obtained in step (b) over one side of a gas permeable membrane while keeping the other side of the membrane in a vacuum, to effect membrane degassing for said water, whereby remaining $H_2$ gas is removed;
   (d) passing treated water obtained in step (c), through an ion exchange resin layer which is a mixture of a $H^+$ strongly acidic cation exchange resin and a $OH^-$ strongly basic anion exchange resin, whereby ions and silica are removed; and
   (e) subjecting treated water obtained in step (d), to ultrafiltration, whereby fine particles are removed.

2. A system for purifying pure water or ultrapure water which system comprises:
   (a) an ozone- or hydrogen peroxide-dissolving unit for adding an oxidizing agent to a pure or ultrapure water and an ultraviolet irradiation unit for removing a total organic carbon component from the pure water or ultrapure water and for sterilizing said water;
   (b) a hydrogen gas-dissolving unit and an ultraviolet irradiation unit for decomposing dissolved oxygen contained in treated water obtained from the ozone- or hydrogen peroxide dissolving unit and the ultraviolet irradiation unit and derived from the addition of the oxidizing agent and for sterilizing the water;
   (c) a membrane degassing unit having a gas permeable membrane for removing remaining $H_2$ gas from treated water from the hydrogen gas-dissolving unit and the ultraviolet irradiation unit;
   (d) an ion exchange unit having an ion exchange resin layer which is a mixture of a $H^+$ strongly acidic cation exchange resin and a $OH^-$ strongly basic anion exchange resin for removing ions and silica from treated water from the membrane degassing unit;
   (e) an ultrafiltration unit for removing fine particles from treated water from the ion exchange unit;
   (f) pipes sequentially connecting the ozone- or hydrogen peroxide-dissolving unit and the ultraviolet irradiation unit, the hydrogen gas-dissolving unit and the ultraviolet irradiation unit, the membrane degassing unit, the ion exchange unit and the ultrafiltration unit (a) to (e) in this order; and
   (g) pumps.

3. A system for purifying pure water or ultrapure water according to claim 2, wherein the gas permeable membrane is a porous hydrophobic membrane which gases permeate but water does not permeate and which is selected from a silicone rubber, a poly(ethylene tetrafluoride), a polyolefin and a polyurethane.

* * * * *

UNITED STATES PATENT AND TRADEMARK OFFICE
CERTIFICATE OF CORRECTION

PATENT NO.   : 5,073,268
DATED        : December 17, 1991
INVENTOR(S)  : Takayuki Saito, et al.

It is certified that error appears in the above-identified patent and that said Letters Patent is hereby corrected as shown below:

On the title page: Item [75]:
Third Inventor's name is misspelled, should be, --Yoko Iwase--.

Signed and Sealed this

Twenty-seventh Day of April, 1993

*Attest:*

MICHAEL K. KIRK

*Attesting Officer*     *Acting Commissioner of Patents and Trademarks*